L. P. LIPPS.
MEANS FOR OPERATING SHOVEL BUCKETS AND SIMILAR RECEPTACLES.
APPLICATION FILED FEB. 7, 1912.
1,059,334.
Patented Apr. 15, 1913.
3 SHEETS—SHEET 2.
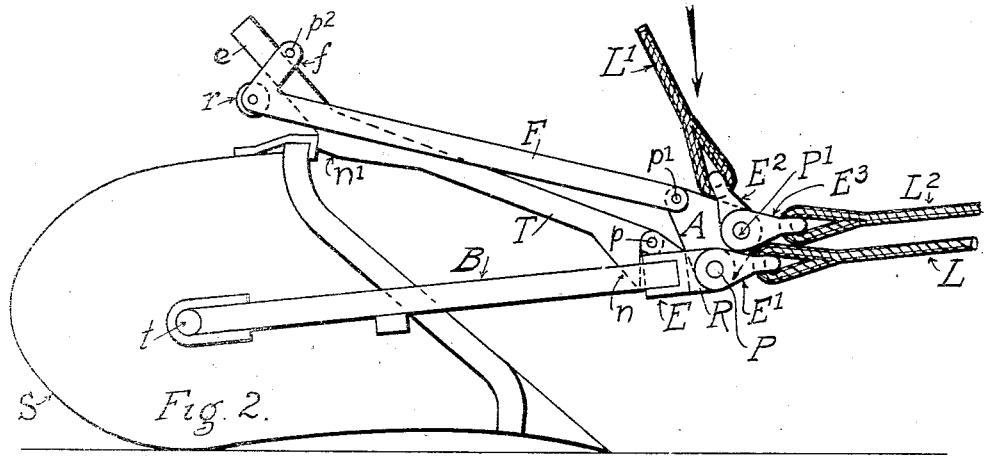
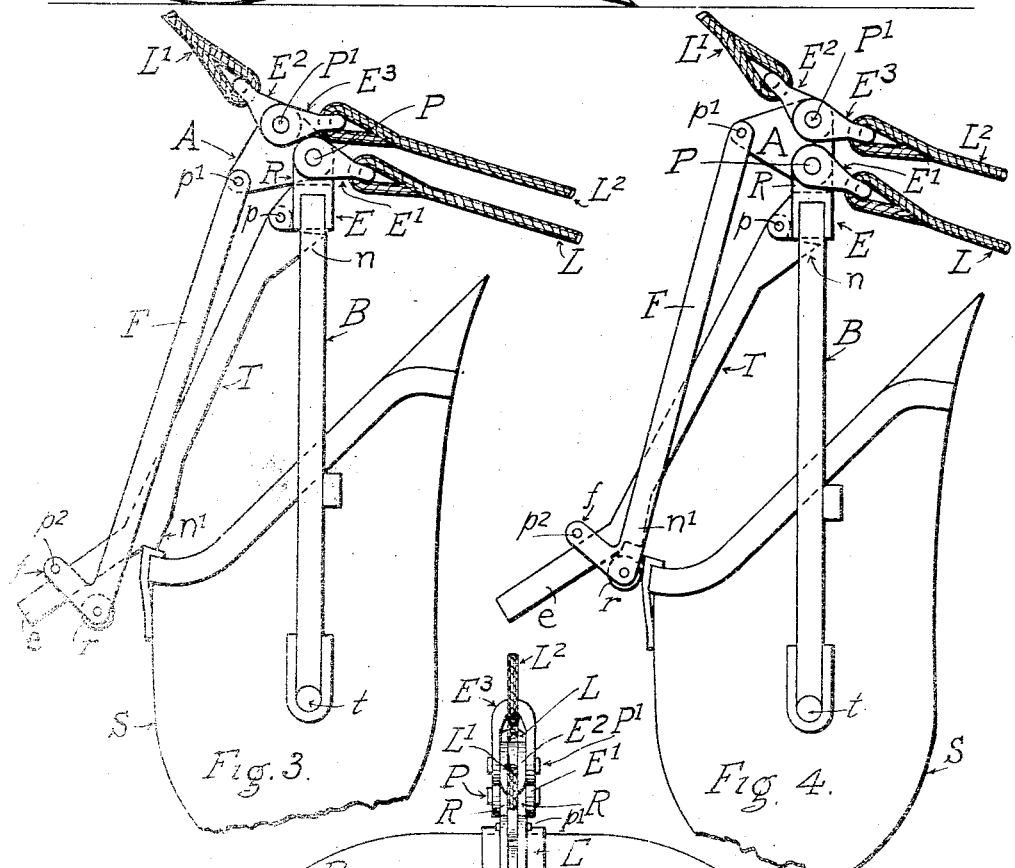
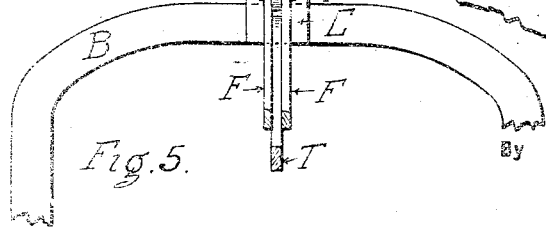

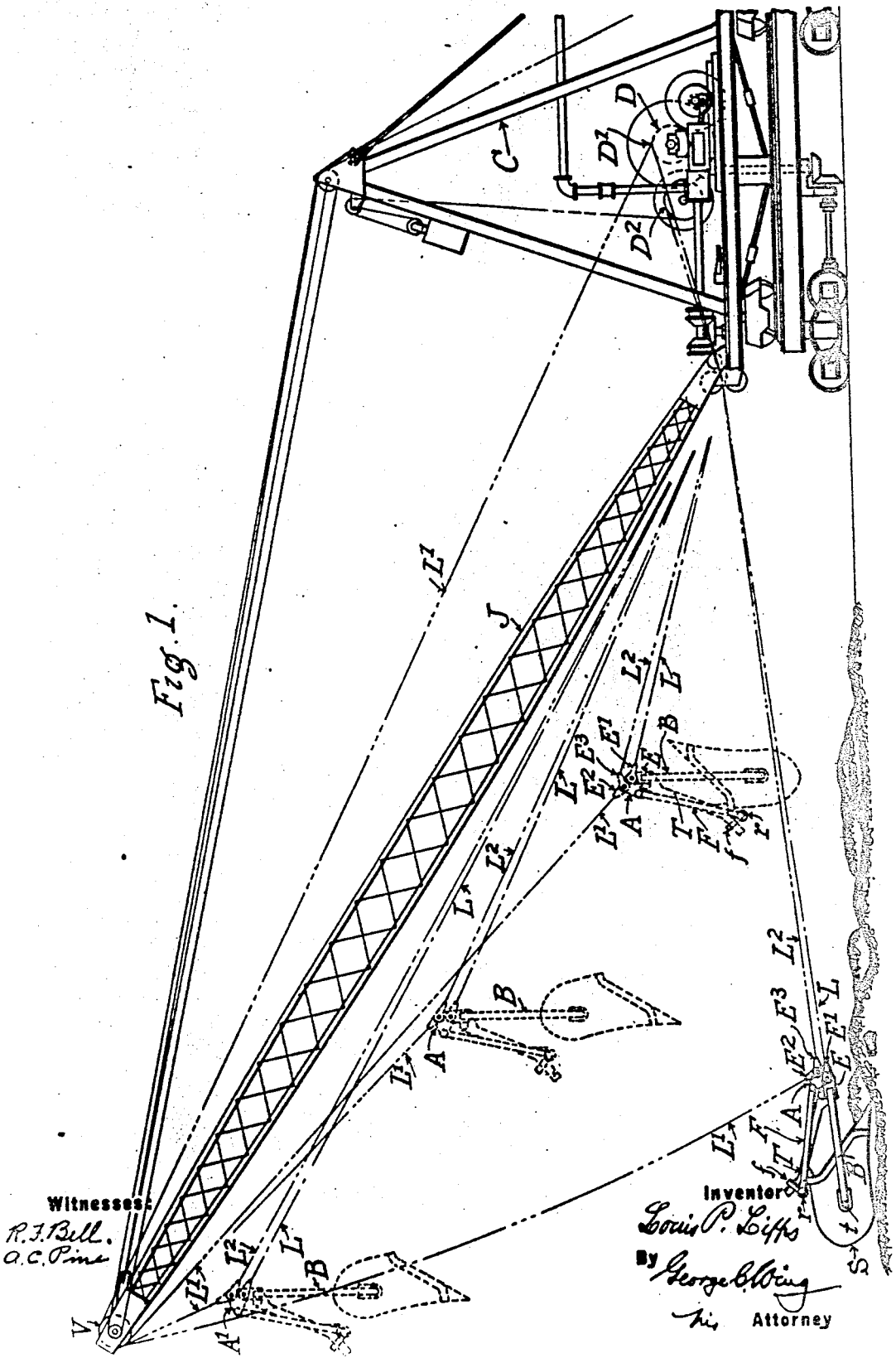

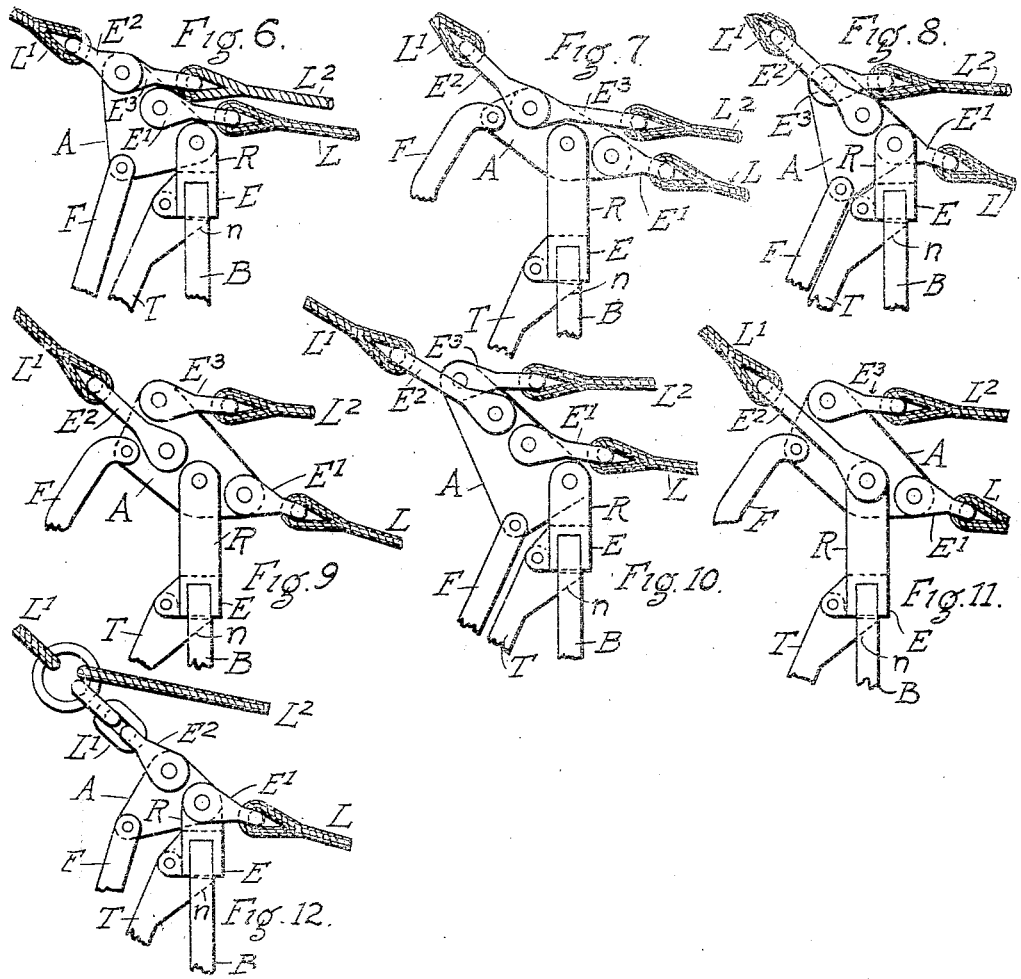

UNITED STATES PATENT OFFICE.

LOUIS P. LIPPS, OF CLEVELAND, OHIO, ASSIGNOR TO THE BROWN HOISTING MACHINERY COMPANY, OF CLEVELAND, OHIO, AN INCORPORATED COMPANY.

MEANS FOR OPERATING SHOVEL-BUCKETS AND SIMILAR RECEPTACLES.

1,059,334. Specification of Letters Patent. Patented Apr. 15, 1913.

Application filed February 7, 1912. Serial No. 676,032.

*To all whom it may concern:*

Be it known that I, LOUIS P. LIPPS, a citizen of the United States, residing at the city of Cleveland, in the county of Cuyahoga and State of Ohio, have invented a new and useful Means for Operating Shovel-Buckets and Similar Receptacles, of which the following is a full, clear, and exact description, reference being had to the accompanying drawings, that form a part of the specifications, wherein similar parts are described by similar letters in each instance.

The device in question, from its nature, is readier of application to and likely to be more generally used in connection with the class of buckets or scoops handled by boom-cranes, wherein the bucket is pivotally suspended within the bail at points on its sides that are forward of the center of gravity of the bucket when empty, but behind the same when loaded, to the end that, when free to move, the bucket will automatically discharge its load and immediately right itself to the proper position with reference to the bail, to take in a new load. It follows, of course, that tail-latches or corresponding devices are usual and necessary, in buckets of this kind, to preserve a fixed relation between the bucket and its bail while the load is being scooped, and to prevent a premature discharge of the same as it is being carried around by the crane to the dumping point. In consequence, it is highly desirable to contrive such a form and connection of the tail-latch, and other parts of the crane-mechanism to which it relates, that, when any dumping point is reached, shall permit the tail-latch to be actuated by the operator, from his station on the crane, and the bucket to turn over and let out its load.

Having in consideration that revolving shovel-buckets of the kind referred to, when used in connection with boom cranes, or similar excavating implements, are invariably controlled in their principal movements by oppositely related hoist and haul-ropes that engage the bucket at or near the bail, but intermediately, through a lever-arm or member suitably connected to a tail-latch unlocking-bar to actuate said bar, and unlock said latch, upon and by reason of the gradual movement to which the opposite pull of said ropes subjects such member, I take advantage of this intermediate member arrangement and, by connecting therewith a third, or tag-line, in the manner described, produce an unlocking device and mechanism that is not limited in its operation to certain predetermined points with respect to the boom, as is the case, so far as I am informed, with respect to most other arrangements of its class, but which may be instantly made effective at any point beneath the boom at which the bucket, for the time being, is suspended.

In the drawings, Figure 1 is a side elevation of an excavating crane with its bucket shown in full lines upon the material-bed, beneath the head of the boom, in position to be hauled in for its load. Dotted lines in the figure indicate the several positions the bucket will assume from the time it has gained a load until the same is dumped. Fig. 2 is an enlarged view of the bucket, and associated parts, shown in Fig. 1. Fig. 3 is a similar view, when the bucket is in position for carrying, with the lower part of the bucket broken away. Fig. 4 is a like view when the latch-bar is unlocked and the bucket is free to dump. Fig. 5 is a broken view of the bail and unlatching features shown in Fig. 2 in the direction of the arrow in that figure, and Figs. 6 to 12 inclusive are enlarged views of methods of connecting the bail, unlatching bar and operating lines to the unlatching bar-actuating lever-member employed, slightly varying one with respect to each other, and, with respect to the corresponding method shown in the previous figures.

C represents a boom or excavating crane of an accepted type, and S is a shovel-bucket to be operated therewith. L is the usual haul-rope, connected, at its outer end, to the bail in the manner to be pointed out, and at its inner end, to a controlling drum D on said crane.

$L^1$ is the hoist-rope. It is mediately connected, at its outer end, to the bail through a lever-arm or member A, and extends upwardly and over a sheave V in the head of the boom, and thence backwardly to a controlling drum $D^1$ on the crane.

B is the bail which pivotally engages the sides of the bucket at points $t, t$, thereon that are forward of the bucket's center of gravity when empty and behind the same when filled. Centrally, and at the top of the bail in Figs. 1–5, is a rigid clevis E having upwardly projecting ears R, R, to and embracing which ears a second clevis E¹ is pivotally fastened, by means of a pin P. To this clevis E¹ the outer end of the haul-rope L is fastened.

The lever-member A referred to is preferably in the form of a triangular plate pivotally connected, through one angle of the same, to and between the jaws of the clevis E¹, by being threaded and fulcrumed upon the pin P. This plate A, and its remaining angles, project backwardly with respect to the bail and the front or shovel portion of the bucket S, when the latter is in its normal or latched position. At the uppermost angle of said plate, when the bucket is in the position last described, a clevis E² (to which is fastened the hoist-rope L¹) is pivotally connected to the same by means of a pin P¹.

The tail-latch proper consists of a bar T, whose upper end is pivotally attached midway of and to the rear of the bail by a pin $p$, the under side of this bar, near the point of this attachment, being, preferably, given an inner projection $n$, to limit or stop any tendency of the bar to swing in that direction when free of its locking engagement with the bucket. On the same side of the bar, at a suitable point to overhang and engage the rear upper edge of the bucket when the latter is in an upright position with relation to the bail, is a second projection or nose $n^1$. The lower end $e$, of the bar T, extends downwardly and outwardly from the shoulder or nose $n^1$, at an angle with the upper portion of said bar.

At the third, and rearmost angle of the plate A (when the bucket is in said normal position) on each side thereof and pivotally attached thereto at their upper-ends by a pin $p^1$, are parallel bars F F. These bars embrace the latch-bar T, and extend downwardly to a point below the inclined portion $e$ of the same, where they are joined together, in a trapeze-like frame, by a cross-roller indicated by $r$. At this point, in order to provide against any undue forward swing of the same, the bars are given sharp upturns $f$, at each side, to above the bar T, where they are connected together by a cross-pin $p^2$.

In order to actuate the unlatching device just explained, at any stage desired of the bucket-carrying operation described, I provide a third or tag-line L², with its inner end connected to and wound around an independently controlled drum D² on the crane-structure or frame, and its outer end flexibly attached to the plate or member A, at such a point thereof with respect to the point of attachment of the hoist-rope L¹, that, when the weight of the bucket and load, in suspension between the hoist and haul-ropes, is shifted from the haul-rope to this third or tag-rope L², the slight consequent downward movement of the load toward a new equilibrium that must ensue, will elevate said third angle, of the triangular plate A, around its fulcrum P, and thereby raise the bars F around their pivot $p^1$. The roller $r$ will thereupon be drawn up along and under the lower edge of the inclined parts $e$ until it lifts the nose $n^1$, of the latch-bar T, out of engagement with the bucket, when the latter will, of course, automatically revolve about its trunnions or pivot points $t$, and the dump be made. As will be manifest, the precise point at which the tag-line L² is to be thus attached to said plate, in order to effect the above operative result, will vary according to the relative location of the other points of attachment involved. Instead of the relation of these several points as shown in Figs. 1–5, for instance, the connection of the unlatching-bar F being substantially as described, the hoist and tag-lines may be connected at the same or different points near the uppermost angle or portion of said plate, and, the haul-line, at the point of connection of the bail with the plate, as shown in Figs. 6, 8, and 12, at a point on such a plate on the other side of the bail-connection, as in Figs. 7 and 9; between the points of connection of the other lines and the bail, as in Fig. 10; or, the tag-line may be attached to the plate at said uppermost part thereof, the haul-line at a point below, and the hoist-line and bail at an intermediate point, as in Fig. 11. Furthermore, the arrangement adopted in the drawings, will be conformed to in principle and be practically operative if the common connection of the hoist and tag-lines, at the uppermost angle of said plate, is brought about by a junction of the tag-line directly with the hoist-line, instead of to the plate at the point where the hoist-line is fastened to the same. The location of the hoist and tag-line connections in each case is such, with respect to each other, and to the points of connection of the load and the unlatching-bars, that said latching-bars shall always be rotated upwardly by the rotatory movement of the plate that necessarily takes place, when, upon the simultaneous releasing of the haul-line, and the braking of the tag-line, the load itself passes to a new condition of equilibrium.' It will generally be found that this condition involves an attachment of both the latch-bar and the tag-line to the plate, at points thereof that are off the vertical with the center of gravity of the bucket when latched.

As a detail in the attachment of the tag-line shown in the drawings, I mount a clevis E³, on the pin P¹, astraddle of the clevis E², and fasten the line L² to said clevis E³.

From what has been said above, the mode of operation of my said improvement will be readily understood. The crane which is to operate the bucket S being so stationed that its boom-head is approximately over the material through which the scoop is to be made, and the bucket suspended beneath said head by the opposite pull of the hoist and haul-ropes, the bucket may be lowered into an operative position by simply paying out said hoist-rope $L^1$. In the ensuing position the bucket will, of course, be frontdown, with the latch-bar T locked against the same. The haul-rope L and the tag-rope $L^2$ are next wound up upon their drums D and $D^2$ and the hoisting rope $L^1$ correspondingly let out, until the bucket has been dragged inwardly, beneath the boom J, and its fill made. The hoist-rope $L^1$ is then wound in, and the drum D, controlling the rope L at the same time braked (with the drum $D^2$ free to move) until the resultant of the two opposite angular pulls or forces thus exerted by said ropes, raises the bucket from its prone position on the material bed, to an upright position (consult Figs. 1 and 2) beneath and nearer the boom J, and is in readiness to be carried along beneath the same. During such carrying operation, the boom itself may be swung around its center in the usual manner, to the line or radius for the dump, when the drums $D^1$ and $D^2$, controlling, respectively, the hoist and tag-lines $L^1$ and $L^2$, are braked, and the drum D, controlling the haul-line L, released. Under these conditions, as will be evident, the tension on the rope L will at once be shifted to the tag-line $L^2$, and its point of connection being at a different point on the member A than that of the haul-rope $L^1$, as described, and one that is off the vertical with the center of gravity of the bucket and load, the latter will swing downwardly, around the boom-head as a center, to a new condition of equilibrium. This movement will, of course, carry upwardly the point of connection of the unlatching-bars F with the plate A, and actuate them to the extent required to draw the roller $r$ up beneath the inclined portion $e$, until it lifts the nose $n^1$ out of engagement with the bucket. As hereinbefore explained the bucket, consequently, will at once automatically revolve about the trunnions or pivot points at $t$ and the dump be made.

Having thus described my said invention, as embodied in a concrete mechanical form, what I claim and wish to protect by Letters Patent, is:—

The combination, with a shovel-bucket, or similar receptacle, pivotally suspended within a bail at points on the side thereof that are forward of the center of gravity of said bucket when empty, and behind said center when loaded, of a latch-bar pivotally connected to said bail at its upper end and projecting outwardly and downwardly, at an angle, at the other end, said latch-bar being of suitable form and dimensions to overhang and engage said bucket when the latter is upright with respect to said bail, a lever-member fulcrumed to said bail, a hoist and a haul-line, oppositely connected to said member in respect to its fulcrum point and a tag-line operatively connected thereto at such a point that when the tension of the load is shifted from the haul-line to the tag-line said member will rotate upwardly around its fulcrum point, together with an unlatching bar extending downwardly to and beneath the projecting end of said latch-bar and pivotally connected to said member at its upper end, at a suitable point thereon to be carried upward during said rotary movement of said lever member, substantially as shown and described.

LOUIS P. LIPPS.

In presence of—
G. W. SPELLMAN,
WILLIS L. WESTCOTT.